US008006571B2

(12) United States Patent
Hersch et al.

(10) Patent No.: US 8,006,571 B2
(45) Date of Patent: Aug. 30, 2011

(54) AIR FLOW MEASUREMENT

(75) Inventors: Mark C. Hersch, Dallas Center, IA (US); Howard St. John, Sealy, TX (US); Kevin Johnson, Des Moines, IA (US)

(73) Assignee: Siemens Industry, Inc., Alpharetta, GA (US)

( * ) Notice: Subject to any disclaimer, the term of this patent is extended or adjusted under 35 U.S.C. 154(b) by 84 days.

(21) Appl. No.: 11/901,914

(22) Filed: Sep. 19, 2007

(65) Prior Publication Data

US 2009/0071241 A1   Mar. 19, 2009

(51) Int. Cl.
*G01F 1/37* (2006.01)
*G01F 1/34* (2006.01)
*F24F 7/00* (2006.01)

(52) U.S. Cl. .................. 73/861.52; 73/861.42; 454/254; 454/255

(58) Field of Classification Search .. 73/861.42–861.69; 454/254, 255, 270, 275–283
See application file for complete search history.

(56) References Cited

U.S. PATENT DOCUMENTS

| | | | | |
|---|---|---|---|---|
| 3,174,423 A | * | 3/1965 | Rigterink et al. | 454/275 |
| 4,848,163 A | | 7/1989 | Vacirca | |
| 4,850,265 A | * | 7/1989 | Raisanen | 454/275 |
| 5,292,280 A | * | 3/1994 | Janu et al. | 454/229 |
| 5,347,843 A | * | 9/1994 | Orr et al. | 73/1.34 |
| 5,439,355 A | * | 8/1995 | Jimison et al. | 73/40 |
| 5,950,326 A | * | 9/1999 | Scott | 34/309 |
| 6,312,389 B1 | | 11/2001 | Kofoed et al. | |
| 6,575,046 B1 | * | 6/2003 | Redington | 73/861.74 |
| 7,120,542 B2 | * | 10/2006 | Kottenstette et al. | 702/45 |
| 7,519,483 B2 | * | 4/2009 | Foucault et al. | 73/861.42 |
| 2002/0016698 A1 | * | 2/2002 | Tokuda | 702/190 |
| 2004/0226382 A1 | * | 11/2004 | Lischer et al. | 73/724 |

FOREIGN PATENT DOCUMENTS

CN   1461429 A   12/2003
WO   0225391      3/2002

OTHER PUBLICATIONS

Chinese Office Action for counterpart application.

* cited by examiner

*Primary Examiner* — Lisa M Caputo
*Assistant Examiner* — Jonathan Dunlap

(57) ABSTRACT

An arrangement for measuring air flow includes a source of measurement values and a processing unit. The source of measurement values is operable to generate measurement values representative of a difference in pressure from air obtained on a first side of an obstruction and air obtained on a second side of the obstruction. The processing unit is configured to, in one case, convert any negative measurement values of the measurement values to a less negative value. The processing unit is further configured to perform low pass filtering on the measurement values and convert the filtered measurement values to a flow value.

20 Claims, 4 Drawing Sheets

AIR FLOW MEASUREMENT

FIELD OF THE INVENTION

The present invention relates to the measure of air flow, and more particularly, to the measure of air flow with a structure.

BACKGROUND OF THE INVENTION

Air flow or air velocity measurements are useful in many applications. For example, occupational safety standards often require a certain minimum amount of fresh air flow into an occupied building. Such standards can also require accurate means for measuring the air flow to ensure that the minimum fresh air flow is being provided. In addition, heating, ventilation and air conditioning (HVAC) systems often rely on air flow measurements to carry out comfort control operations.

Different air flow measurement schemes have been employed in the past with varying degrees of success. Many of these schemes are used, for example, to measure fresh air flow into a building or facility. Typical schemes involve placing air flow measurement tubes within a long length of ductwork at or near the fresh air inlet of a building. A drawback of these traditional schemes arises from the fact that in many cases, long lengths of ductwork are not available to facilitate proper placement and operation of the air flow measurement tubes.

Accordingly, alternate schemes have been developed to measure air flow without requiring a long duct. One such scheme involves the use of hot wire anemometers. This scheme involves placing a number of temperature measurement devices and heated wires, in or near an air flow inlet. The measured temperature proximate the heated wire is a function of air flow (convection) as well as current through the wire. Because the current through the wire is controllable and/or measurable, air flow may be estimated using the temperature measurements from areas proximate the wire. While this scheme can be calibrated to produce sufficient accuracy, there is significant cost associated with its use and installation.

Another simpler scheme for measuring the air flow into a building involves the use of a spring-biased door at the air inlet of a building. Inward air flow pushes the door open in varying degrees. The amount that the door is forced open depends on the air flow. As a consequence, a measurement of the position angle of the air inlet door provides a measurement of the inward air flow. While this scheme can represent a more cost effective measurement arrangement than those involve hot wire anemometers, this swinging door arrangement requires extensive calibration as well as complex installation procedures.

Still other air flow measurement schemes suffer other drawbacks. Many include expensive equipment, and others are limited by the amount of air flow they can support.

There is a need, therefore, for an air flow measurement arrangement and/or method that addresses the drawbacks of the prior art. Such an air flow arrangement and/or method preferably balances the need for accuracy with the need for reducing cost and installation complexity.

SUMMARY OF THE INVENTION

At least some embodiments of the invention address the above described needs by providing an air flow arrangement that includes using digital processing and/or other features to reduce errors without necessarily resorting to expensive measurement equipment. However, the principles of the present invention can also provide advantages in installations using high cost equipment.

A first embodiment is an arrangement for measuring air flow includes a source of measurement values and a processing unit. The source of measurement values is operable to generate measurement values representative of a difference in pressure from air obtained on a first side of an obstruction and air obtained on a second side of the obstruction. The processing unit is configured to convert any negative measurement values of the measurement values to a less negative value. The processing unit is further configured to perform low pass filtering on the measurement values and convert the filtered measurement values to a flow value.

A second embodiment is an arrangement for measuring air flow includes a source of measurement values and a processing unit. The source of measurement values is operable to generate measurement values representative of a difference in pressure from air obtained on a first side of an obstruction and air obtained on a second side of the obstruction. The processing unit is configured to perform low pass filtering on the measurement values and convert the filtered measurement values to a flow value based at least in part on a zero offset compensation value. The zero offset compensation value is dependent on physical conditions of the source of measurement values.

Features and advantages of the above described embodiments, as well as others, will become more readily apparent to those of ordinary skill in the art by reference to the following detailed description and accompanying drawings.

DETAILED DESCRIPTION

Figure 1:
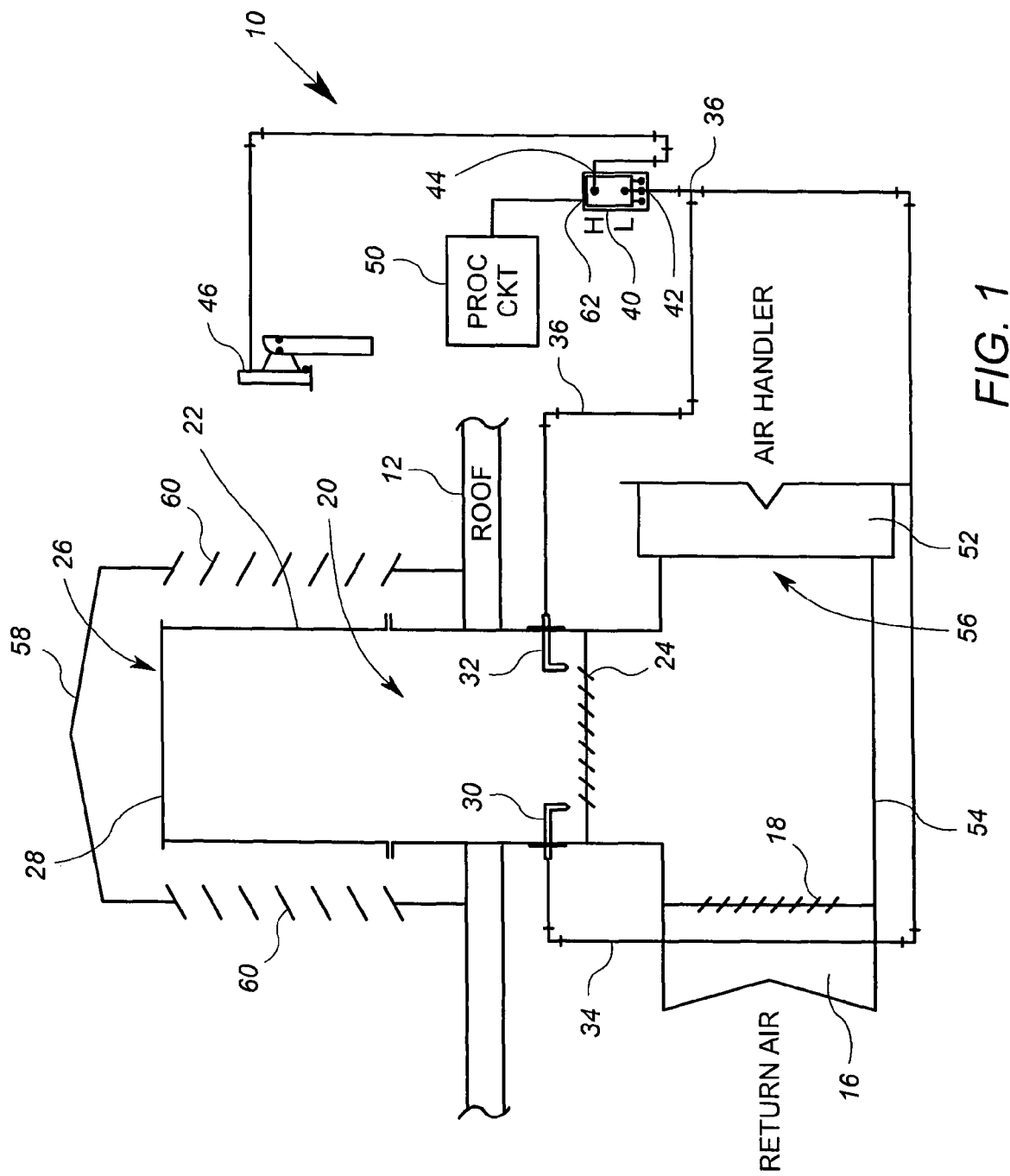
FIG. 1 shows an arrangement for obtaining an air flow measurement in accordance with a first exemplary embodiment of the invention.

FIG. 1 shows an arrangement for obtaining an air flow measurement in accordance with a first exemplary embodiment of the invention. The arrangement includes an air flow measurement system 10, and is shown installed in an exemplary implementation at the supply air subsystem of an air handling unit (AHU) 52 of a building. As is known in the art, the AHU 52 is a device that provides supply air to various spaces of a building not shown. The supply air may be chilled or heated by the AHU 52, depending on the needs of the building. The supply air may constitute a combination of fresh and recycled air. AHUs are well known in the art.

In FIG. 1, only the input side of the AHU 52 is shown for clarity of exposition. In particular, the AHU 52 includes an AHU inlet 56 on its input side. The AHU inlet 56 represents the interface between the AHU 52 and an input duct 54. The input duct 54 is in fluid communication with and coupled to a return air inlet 16 of the building via a return air damper 18. As is known in the art, the return air inlet 16 is coupled to the return air path of the building, and contains air from the spaces that has been circulated through the building. The return air may contain contaminants, an increased amount of CO or CO2, and/or a reduced amount of oxygen. Accordingly, the amount of return air that is recirculated to the AHU 52 is limited. To limit the recirculated air, the return air damper 18 is controlled by a controller, not shown, but which would be known to those of ordinary skill in the art.

The input duct 54 is in fluid communication with and coupled to a fresh air inlet 20 of the building via a fresh air damper 24. As is known in the art, the fresh air inlet 20 is coupled to the outside atmosphere, which allows for fresh air to be admitted to the HVAC system through the AHU 52. The fresh air damper 24 is controlled by a controller in a manner generally known to those of ordinary skill in the art to control the amount of fresh air that enters the AHU 52. As will be discussed below, the fresh air damper 24 may suitably be controlled by the processing circuit 50 shown in FIG. 1, or by a separate controller such as any suitable commercially available field controller.

In the embodiment of FIG. 1, the air inlet 20 is covered by a roof housing structure 58, sometimes referred to as a doghouse, which is well known in the art. The roof housing structure 58 is basically a ventilation housing that covers an opening in the roof 12 in which the air inlet 20 is located. The size and shape of the roof housing structure 58 varies from system to system, but a typical structure can be a few feet high, a few feet long and two or three feet wide. The roof housing structure 58 typically includes ventilation openings 60 that allow air to enter the housing structure 58 and thence to the air inlet 20.

In the embodiment described herein, an inlet extension 22 extends from the air inlet 20 to a location that is proximate the top of the roof housing structure 58. Preferably, the inlet extension 22 extends such that most of the ventilation openings 60 in the roof housing structure 58 are below the top most part of the inlet extension 22. The inlet extension 22 preferably includes a duct having an opening at its top. This opening at the top of the inlet extension 22 defines an extension air inlet 26. The purpose of the inlet extension 22 is to move the effective building air inlet from the actual roof air inlet 20 to a point nearer the top of the roof housing structure 58. It has been determined that moving the effective building air inlet above the ventilation openings 60 of the housing structure 58 reduces the deleterious effect of wind and wind gusts on air flow measurements.

In the embodiment described herein, a partial obstruction 28 is placed proximate to the effective building air inlet 26 to define an air flow measurement interface. The partial obstruction 28 is a structure that is placed over the inlet 26 to the inlet extension 22 to partially restrict and/or focus the air flow. Differential air pressure measurements can then be taken using air on each side of the interface. It is known that in order to obtain useful measurable air flow values, it is advantageous to restrict the air flow through a measurement interface. The partial obstruction 28 provides this restriction at the measurement air flow interface.

In the embodiment described herein, the obstruction 28 is an expanded metal screen. However, the obstruction 28 may take other suitable forms, including, for example, a manual damper that is not adjusted on a regular basis. It is advantageous to ensure that the air flow is not too much restricted by the obstruction 28, creating an undesirably large pressure drop. It is, however, likewise advantageous to ensure sufficient restriction of the air flow to obtain a good signal to noise ratio in the differential pressure measurement carried out by the differential pressure sensor 40. An expanded metal screen provides a moderate obstruction 28 that can balance these competing needs.

In the embodiment that employs an expanded metal screen as the obstruction 28, initial set-up tests may be performed to determine whether the expanded metal screen is providing too little or too great of a pressure drop as the measurement interface. If the pressure drop is too great, then further holes may be cut into the expanded metal screen to decrease the air flow restriction. If, on the other hand, the low flow calculations are noisy because of a poor signal to noise ratio, then another screen or partial obstruction may be added to the first obstruction. Thus, upon initial set-up, the air flow restriction at the measurement interface (i.e. effective building inlet/measurement interface 26) may be enhanced or optimized by combinations of these adjustments.

As discussed above, air flow measurements in the embodiment of FIG. 1 are carried out by obtaining the pressure differential between air located on both sides of the measurement interface or air intake 26. To this end, a plurality of static air pickup devices 30, 32 are coupled proximate the air inlet 20, and more specifically, on a first side of the effective building air inlet 26. The air pickup devices 30, 32 are mounted external to the controlled fresh air damper 24 in the embodiment described herein. The air pickup devices 30, 32 (and any number of others, not shown), are operably coupled to the differential pressure sensor or draft gauge 40 via conduits 34, 36, respectively. The conduits 34, 36 may suitably comprise hollow tubing, and are coupled to a first differential input 42 of the draft gauge 40. The air pickup devices 30, 32 may suitably be any commercially available air pickup devices, preferably a model having an angled tip. A suitable air pickup device is the model A301 pickup device from Dwyer Instruments, Inc. of Michigan City, Ind., or the model 269062 pickup device available from Siemens Building Technologies, Inc. of Buffalo Grove Ill.

It is preferable to employ multiple air pickup devices, including the pickup devices 30, 32 as well as others, not shown, to provide the air connection from inside the inlet extension 22 to the first differential input 42. The use of multiple pickup devices helps limit the deleterious effects of wind gusts on the measurements.

An external air pickup device 46 provides air from the other "side" of the measurement interface 26. In particular, an external air pickup device 46 is disposed outside of the extension inlet 22 and measurement interface 26. It is noted that the external air pickup device 46 is disposed such that the inlet/measurement interface 26 is disposed between the device 46 and the air pickup devices 30, 32 in an airflow sense. The external air pickup device 46 is coupled via a conduit 48 to a second input 44 of the draft gauge 40. The external air pickup device 46 is preferably a pickup device intended for outdoor use, and preferably includes a filter. An example of a suitable external air pickup device is the model A306 air pickup device available from Dwyer Instruments, Inc. of Michigan City, Ind.

The draft gauge 40 is a device that is configured to generate a differential pressure measurement based on air received at the first and second differential inputs 42 and 44. A suitable device is the model 264 differential pressure transducer or the model 265 differential pressure transducer, each available from Setra Systems, Inc. of Boxborough, Mass. Other similar and competitive devices may also be used.

The draft gauge 40 is further operable to provide an output signal, which is representative of the measured differential pressure, to an input of the processing circuit 50. The processing circuit 50 may suitably be a controller or processor in a commercially available field panel or field controller for an HVAC system. By way of example, the processing circuit 50 may be an MEC field controller available from Siemens Building Technologies, Inc. of Buffalo Grove 111. Such field controllers include analog inputs that are compatible with the output of commercial embodiments of the draft gauge 40. Such field controllers further include inputs that can accommodate digital pulse train outputs of the draft gauge 40 if they are available.

In operation, fresh air enters the building for use by the occupants via the roof inlet 20. To this end, the AHU 52 draws fresh air from outside of the housing structure 58 to the effective air inlet 26 via the ventilation openings 60. The in-drawn air enters the inlet extension 22 via the partial obstruction 28, which creates a measurable pressure differential under most circumstances. The air that is drawn through the inlet extension 22 travels through the air inlet damper 24 into the input duct 54. This air is also sampled by the air pickup devices 30, 32, and provided to the draft gauge 40. The air in the input duct 54 mixes with recirculated air received via the return air inlet 16 and is provided to the air handler 52 via the AHU inlet 56. The AHU 52 then provides the air, often adding heating or chilling to the air, to the ventilation system of the building, not shown.

Contemporaneously, the external pickup device 46 obtains air from outside of the enclosure formed by the inlet extension 22 and the partial obstruction 28. The external pickup device 46 provides the external air to the draft gauge 40 via the conduit 48. The draft gauge 40 generates a measurement signal indicative of the difference in air pressure between the internal air received from the pickup devices 30, 32, and the external air received from the external pickup device 46. This pressure differential provides a measure related to the air flow through the obstruction 28, and hence the air flow into the building. The measurement signal representative of the pressure differential is provided to the processing circuit 50. These signals are provide on an ongoing basis to the processing circuit 50 as the draft gauge 40 more or less continuously provides the measurement signal in response to the pressure differential at its inputs 42, 44.

In the embodiment described herein, the processing circuit 50 digitally samples the measurement signal at a rate of one to five samples per second. To this end, the processing circuit 50 preferably includes analog to digital conversion circuitry well known in the art. The processing circuit 50 the processes the raw measurement signal to obtain a processed measurement signal, and from thence a flow rate measurement, as will be discussed in detail in connection with FIG. 2. The flow rate measurements may then be further processed, stored, and/or communicated to other devices. By way of example, the flow rate measurements may be used to further control the dampers 18 and 24 to adjust the fresh air flow rate.

Figure 2:
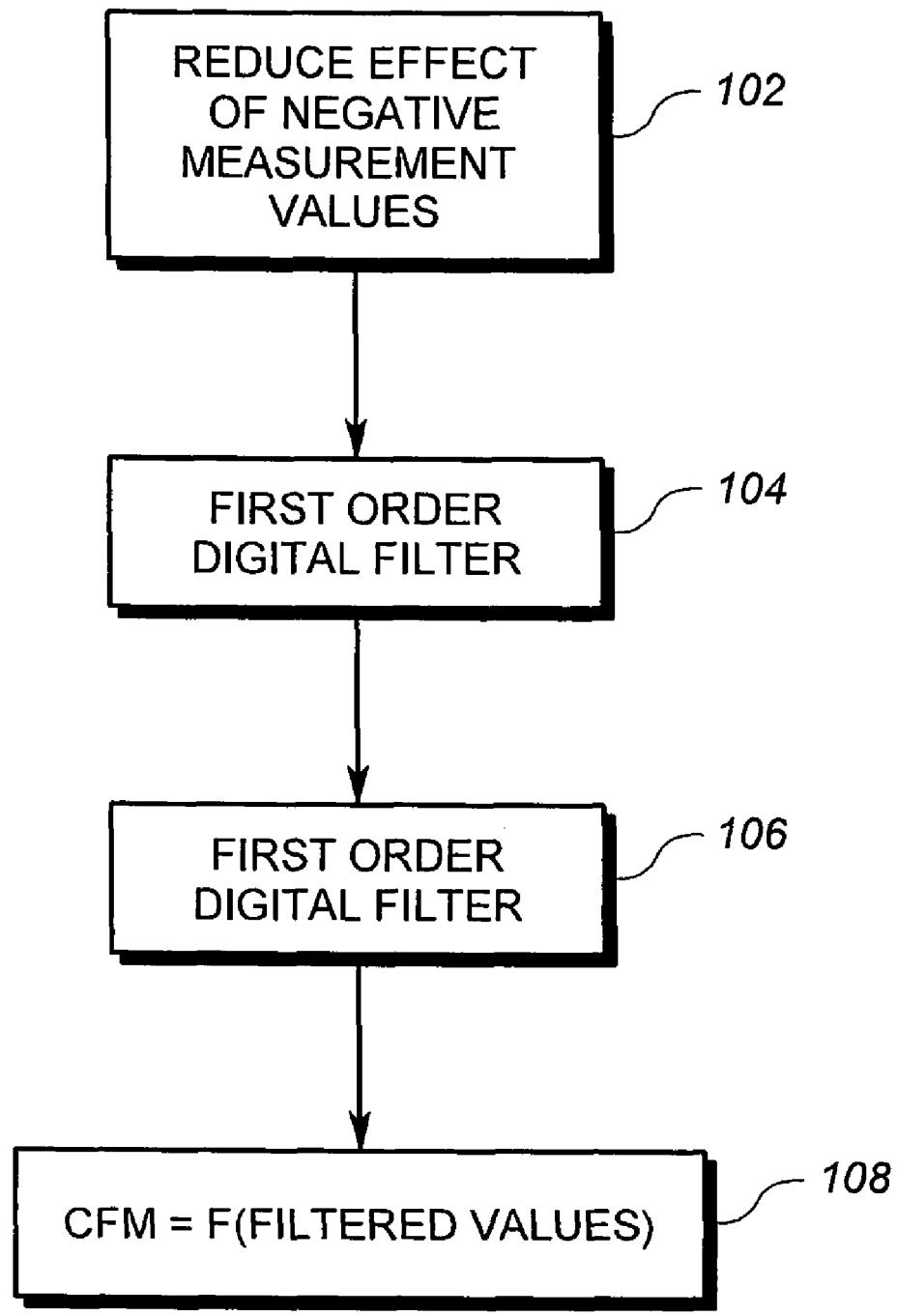
FIG. 2 shows a block diagram of the signal processing operations of the processing circuit of FIG. 1.

FIG. 2 shows an exemplary set of operations that can be carried out by the processing circuit 50 to generate air flow measurement values based on the raw differential pressure measurement signals received from the draft gage 40. For the operations of FIG. 2, is presumed that the raw measurement signal has been sampled and consists of a series of digital values. As discussed above, the sampling frequency may suitably be one to five samples per second.

In step 102, the processing circuit 50 initially processes the measurement signal samples to eliminate any negative pressure differential values, i.e., where the pressure measured from the air received from the external pickup device 46 is less than the pressure measured from the air received from the internal pickup devices 30, 32. Typically, the negative measurements are due to wind gusting and/or air eddy currents near the pickup devices 30, 32, and may be disregarded. In this embodiment, any negative measurement values are set to zero. Thus, a sequence of measurement values of −4, 3, −2, 3, 2 (in arbitrary units) would be processed in step 102 to the sequence of values 0, 3, 0, 3, 2.

In alternative embodiments, other methods of reducing the influence of negative measurements may be employed. For example, any negative values may be reduced to a smaller constant or variable value. By "reduced", it is meant that a negative number will be "less negative", which on an absolute scale would technically constitute a greater value.

In any event, in steps 104 and 106, processing circuit 50 performs the operation of a second order digital filter on the processed measurement values. To this end, the processed measurement values are placed into a first order digital filter in step 104, and thereafter into another first order digital filter in step 106. While a higher or lower order filter may be used, it has been found that a second order filter balances the need for better signal quality filtering without introducing undue amounts of delay.

After step 106, the processing circuit 50 converts the filtered and process differential pressure measurements to air flow in step 108. In a simplified embodiment, the processing circuit uses the following relationship to calculate air flow based on differential pressure measurements:

$$CFM = K * sqrt(\Delta P)$$

where K is constant factor based on the physical characteristics of the measurement arrangement, $\Delta P$ is the differential pressure measurement, and CFM is the flow in cubic feet per minute. The value of K may be determined in calibration by measuring a known air flow $CFM_{cal}$ using a standardized and accurate procedure, and recording the measured differential pressure $\Delta P_{cal}$. The value K is set to $CFM_{cal}/sqrt(\Delta P_{cal})$.

It has been determined that many differential pressure sensors 40 and/or arrangements of sensors 40 and associated pickup devices do not necessarily read zero when there is no actual pressure differential. Accordingly, another embodiment includes a zero pressure offset adjustment to compensate for this behavior in the differential pressure measurement arrangement. In this embodiment, the processing circuit in step 108 generates the air flow value based on the following equation:

$$CFM = CFM_{cal} * [\{sqrt(\Delta P/\Delta P_{cal})\} * \{1-1/(1-\alpha)\} + \{1 - 1/(1-\alpha)\}]$$

where $CFM_{cal}$ and $\Delta P_{cal}$ are calculated as described above, and where $\alpha$ is a part of a zero offset adjustment given by:

$$\alpha = sqrt(\Delta P_{cal}/\Delta P_\phi)$$

wherein $\Delta P_\phi$ is a calibration pressure measurement taken when the differential pressure is substantially zero. To obtain $\Delta P_\phi$, the arrangement should be arranged such that there exists zero or nearly zero pressure differential. Once the differential pressure is zero, then the differential pressure measurement is taken. The measured value obtained when the differential pressure is set to zero is the value $\Delta P_\phi$.

In the embodiment of FIG. 1, the value $\Delta P_\phi$ may be obtained by fully closing the inlet air damper 24 and running the supply fan, not shown, of the AHU 52, with the return air damper 18 open. Because the damper 24 is closed, the air at the air pickup devices 30 and 32 should equalize to the air at the external pickup device 46. The measurement of the draft gauge 40 under these conditions should ideally equal zero. Any differential pressure measured by the draft gauge 40 under these conditions becomes the value $\Delta P_\phi$.

These calibration operations thus provide the values of $CFM_{cal}$, $\Delta P_{cal}$, $\Delta P_\phi$ that are necessary to use the conversion equation of step 108 of FIG. 2. Accordingly, using either of the CFM equations set forth further above, the processing circuit 50 converts the filtered differential pressure values generated in step 106 to air flow values. The processing circuit 50 may then use the air flow values for control of elements of the HVAC system, as is known in the art, and/or may store, display or communicate air flow values as needed or desired.

In one example, the processing circuit 50 may control the operation of the fresh air damper 24 in order to attempt to obtain a desired air flow. In such a case, the processing circuit 50 would receive a fresh air flow set point from another control device, not shown, and then adjust the damper 24 based on differences between the fresh air flow set point and the actual measured air flow generated in accordance with the operations of FIG. 2. The fresh air set point defines the required or desired fresh air flow for the building, or at least for this air inlet 20 of the building. The processing circuit 50 may suitably use PI or PID control methods to adjust the damper position based on the error (or difference) between the set point and the measured value.

Regardless, the operations of FIG. 2 are performed on an ongoing basis by the processing circuit 50 as new digital samples of the analog measurement signal from the draft gauge 40 are generated or made available.

Referring again to the embodiment of FIG. 1, one of the advantages of this embodiment is the inlet extension 22. The inlet extension 22 reduces noise and/or interference in the pressure measurements by significantly reducing the effect of wind on the air obtained by the pickup devices 30, 32. By contrast, if the inlet extension 22 is not provided, winds received via the ventilation openings 60 can adversely affect flow measurements. The inlet extension 22 may also provide advantages to other types of flow measurement configurations, such as those based on hot wire anemometers, or swinging air inlet door obstructions. It is noted that the inlet extension 22 may take the form of simple wind barriers or walls that effectively block wind gusts. It is noted that the measurement interface may be located at any position in which it is protected from wind gusts.

The embodiment of FIG. 1 is also particularly well-suited for retrofit into an existing outside air intake structure of a building. The placement of the inlet extension 22, the pickup devices 30, 32 and 46, the obstruction 28, and the draft gauge 40 may all be carried out relatively inexpensively. The retrofit is further facilitated if a suitable processing circuit 50 (i.e. a controller) is already available, or can be easily added. As discussed above, the MEC field controller may be configured to carry out the processing operations of FIG. 2.

Figure 3:
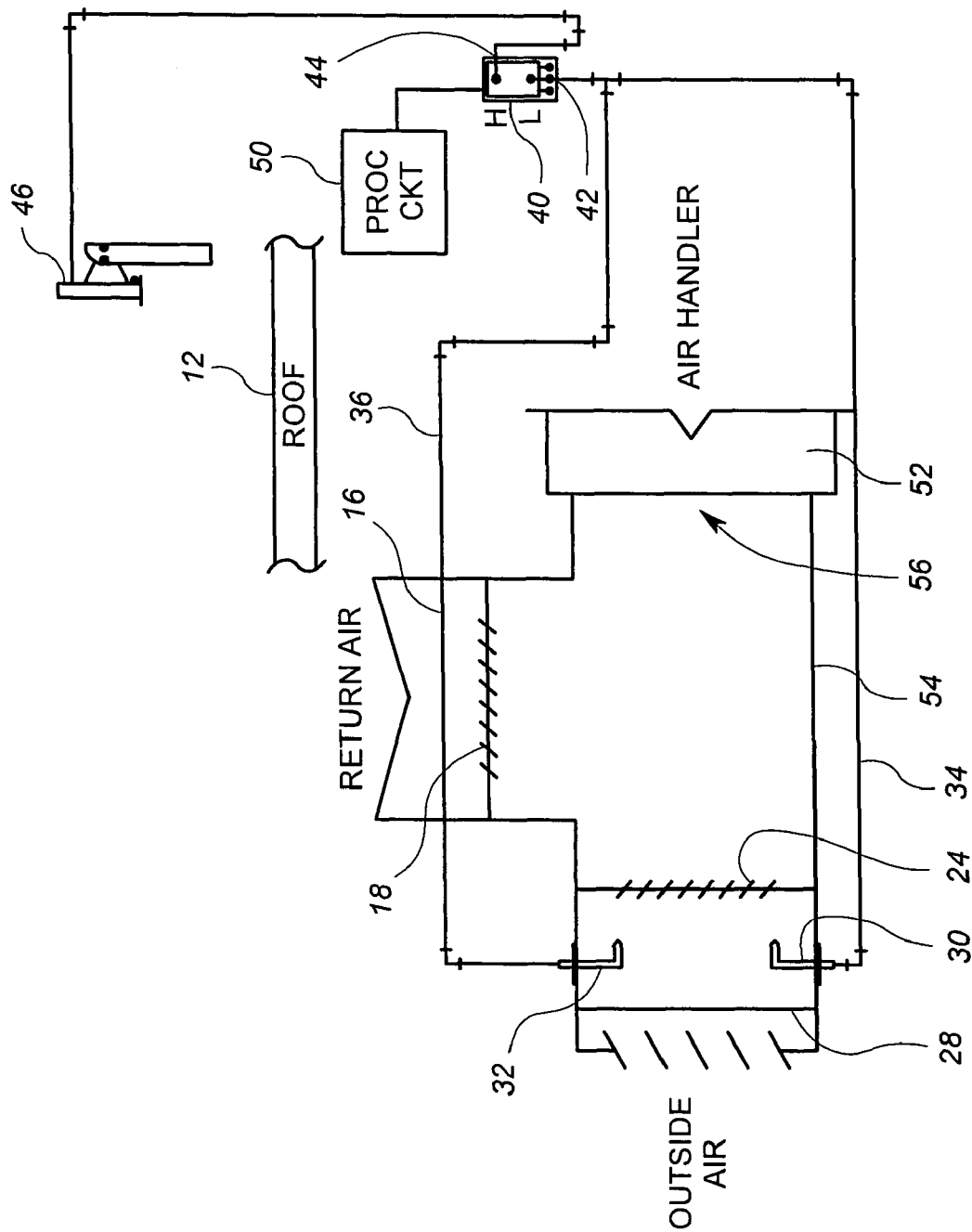
FIG. 3 shows an arrangement for obtaining an air flow measurement in accordance with a second exemplary embodiment of the invention.

It will be appreciated that not all building roof systems have a doghouse-type roof housing structure associated with their outside air intake openings. FIG. 3 shows another embodiment of the invention configured for another general style of air intake that does not include a doghouse-style roof housing structure similar to the roof housing structure 58 of FIG. 1. It will be noted that like reference numbers are used to identify like devices in FIGS. 1 and 3.

In general, it is noted that the relative placement of the air pickup devices 30, 32 and 46 does not change. As with the embodiment of FIG. 1, the air pickup devices 30, 32 are external to the input air damper 24, and internal to an obstruction 28. The obstruction 28 is located internal to a generally static air ventilation damper 72, which is similar to the louvered openings 60 of the roof housing structure 58, and external to the input air damper 24. The external air damper 46 is located external to the obstruction 28.

The draft gauge 40 and the processing circuit 50 operate as described above in connection with FIG. 1. Calibration remains the same.

While the arrangement described herein is particularly useful for measuring (and thus controlling) fresh air supply into a building, other embodiments may be used for measuring flow through any conduit. In particular, the obstruction 28 may be place over any duct defining the measurement point.

Figure 4:
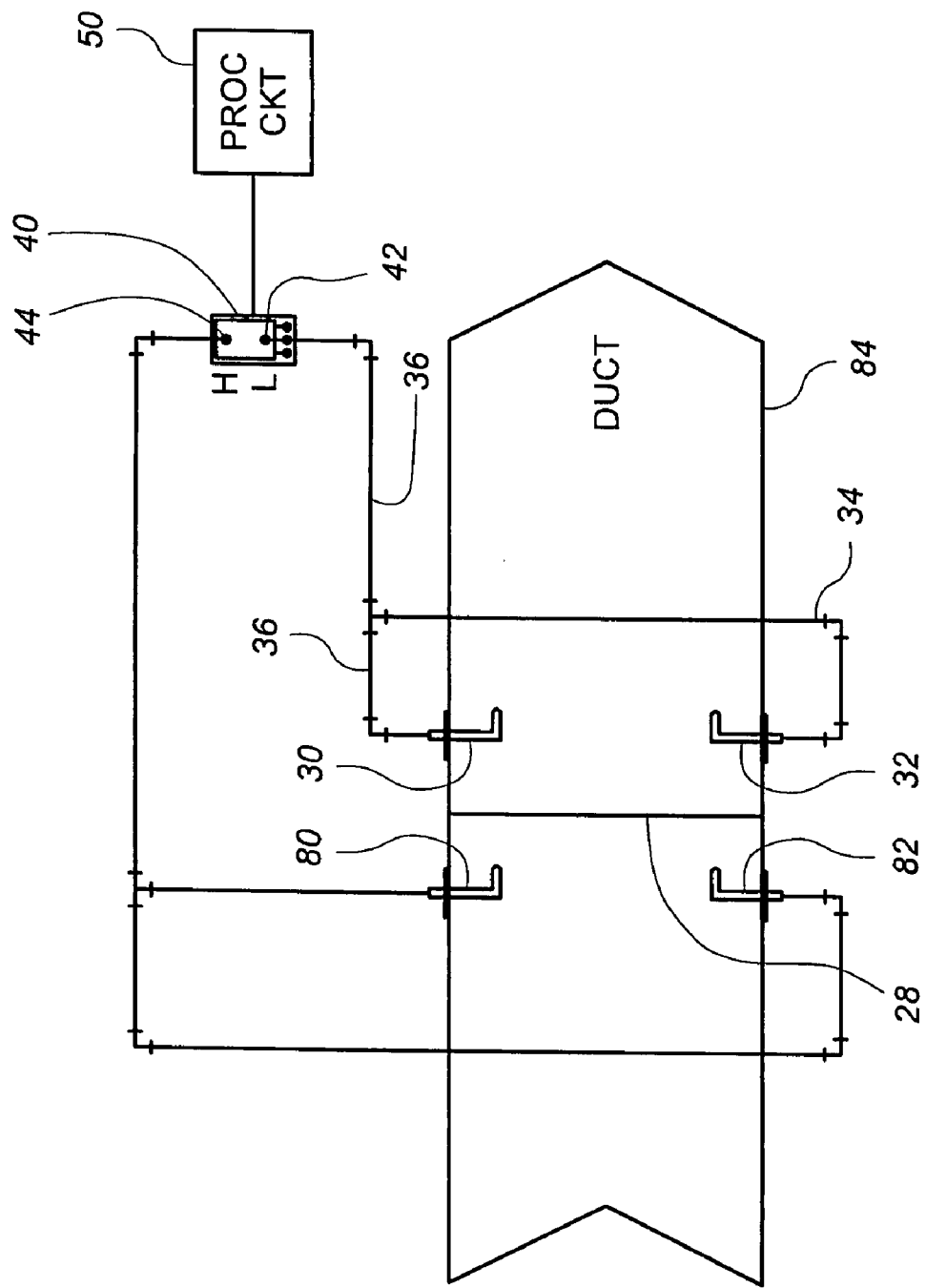
FIG. 4 shows an arrangement for obtaining an air flow measurement in accordance with a third exemplary embodiment of the invention.

For example, FIG. 4 shows an illustrative embodiment of the invention applied to an internal air duct within a facility. In this case, the pickup devices such as devices 30, 32 may be placed in the air flow on both sides of the obstruction 28. As shown in FIG. 4, the pickup devices 30, 32 on a first side of the obstruction 28 are coupled to a first input 42 of the draft gauge 40 while pickup devices 80, 82 on the second side of the obstruction 28 are coupled to a second input 44 of the draft gauge 40. In this embodiment, the pickup devices 80 and 82 may suitably have the same construction as the devices 30, 32. The processing circuit 50 receives differential pressure measurement values from the draft gauge and operates in generally the same manner as discussed above.

It will be appreciated that calibration of the duct system of FIG. 4 may carried out similar to the calibration method described above in connection with FIG. 1. However, to obtain the $\Delta P_\phi$ value, the air flow to the duct is reduced to zero air flow by closing the appropriate upstream and downstream dampers not shown.

It will appreciated that the above described embodiments are merely exemplary, and that those of ordinary skill in the art may readily devise their own implementations and modifications that incorporate the principles of the present invention and fall within the spirit and scope thereof.

We claim:

1. An arrangement for measuring air flow, comprising:
a source of measurement values representative of a difference in pressure from air obtained on a first side of an obstruction and air obtained on a second side of the obstruction, wherein the measurement values are representative of a difference in pressure from air obtained on the first side of the obstruction when the first obstruction is exposed to atmospheric pressure;
a processing unit configured to,
perform digital processing to convert any negative measurement values of the measurement values to a less negative value;
perform low pass filtering on the measurement values; and
convert the filtered measurement values to a flow value.

2. The arrangement of claim 1, wherein the processing unit is further configured to convert the filtered measurement values to the flow value using, at least in a part, a compensation value, the compensation value compensating for a measurement offset of the arrangement under zero flow conditions.

3. The arrangement of claim 2, wherein the obstruction comprises an expanded metal screen.

4. The arrangement of claim 1, wherein the processing unit is further configured to perform low pass filtering using a second order low pass filter.

5. The arrangement of claim 1, wherein the source of measurement values includes a differential pressure sensor.

6. The arrangement of claim 5, further comprising a plurality of pickup devices having an end coupled proximate the first side of the obstruction such that the obstruction is disposed between a pickup end of each of the plurality of pickup devices and the second side of the obstruction, the plurality of pickup devices further operably coupled in fluid communication with the differential pressure sensor.

7. The arrangement of claim 6, further comprising a pickup device coupled proximate the second side such that the obstruction is disposed between the first side and the pickup device.

8. The arrangement of claim 7, further comprising the obstruction, and wherein the obstruction fits in a duct opening and has less flow area than the duct opening.

9. The arrangement of claim 8, wherein the obstruction comprises an expanded metal screen.

10. The arrangement of claim 1, further comprising the obstruction, and wherein the obstruction fits in a duct opening and has less flow area than the duct opening.

11. The arrangement of claim 1 wherein the obstruction is positioned within an air flow conduit extending above a roofline.

12. The arrangement of claim 11 further comprising a roof housing structure including a plurality of ventilation openings, the air flow conduit extending into the roof housing structure.

13. The arrangement of claim 12 wherein the air flow conduit includes an uppermost opening disposed above a level of the plurality of the ventilation openings in the roof housing structure.

14. The arrangement of claim 13 wherein the first side of the obstruction is within the air flow conduit and the second side of the obstruction is outside of the air flow conduit.

15. The arrangement of claim 1 wherein the first side of the obstruction is within the air flow conduit and the second side of the obstruction is within the air flow conduit.

16. An arrangement for measuring air flow, comprising:
a source of measurement values representative of a difference in pressure from air on a first side of an obstruction exposed to atmospheric pressure and air on a second side of the obstruction;
a processing unit configured to,
perform digital processing to convert any negative measurement values of the measurement values to a less negative value;
perform low pass filtering on the measurement values; and
convert the filtered measurement values to a flow value.

17. The arrangement of claim 16 wherein the obstruction is positioned within an air flow conduit extending above a roofline.

18. An arrangement for measuring air flow, comprising:
a source of measurement values representative of a difference in pressure from air on a first side of an obstruction and air on a second side of the obstruction, the obstruction positioned within an air flow conduit, and the air flow conduit extending above a roofline;
a processing unit configured to,
perform digital processing to convert any negative measurement values of the measurement values to a less negative value;
perform low pass filtering on the measurement values; and
convert the filtered measurement values to a flow value.

19. The arrangement of claim 18 further comprising a roof housing structure positioned above the roofline, the roof housing structure including a plurality of ventilation openings, and the air flow conduit extending into the roof housing structure.

20. The arrangement of claim 18, further comprising the obstruction positioned in a duct opening, the obstruction providing less flow area than the duct opening.

* * * * *